United States Patent
Feng et al.

(10) Patent No.: US 11,158,881 B2
(45) Date of Patent: Oct. 26, 2021

(54) POLYMER SOLID ELECTROLYTE, PREPARATION METHOD THEREOF AND PREPARATION METHOD OF LITHIATED CARBON DOT

(71) Applicant: TIANJIN UNIVERSITY, Tianjin (CN)

(72) Inventors: Wei Feng, Tianjiin (CN); Zeyu Li, Tianjin (CN); Yu Li, Tianjin (CN); Chen Cao, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 67 days.

(21) Appl. No.: 16/400,200

(22) Filed: May 1, 2019

(65) Prior Publication Data

US 2020/0227782 A1    Jul. 16, 2020

(30) Foreign Application Priority Data

Jan. 10, 2019    (CN) .......................... 201910022806.3

(51) Int. Cl.

| | |
|---|---|
| *H01M 10/0565* | (2010.01) |
| *H01M 10/0525* | (2010.01) |
| *C01B 32/15* | (2017.01) |
| *C08L 71/02* | (2006.01) |
| *C08L 33/20* | (2006.01) |
| *C08L 23/14* | (2006.01) |
| *B82Y 30/00* | (2011.01) |

(52) U.S. Cl.
CPC ......... *H01M 10/0565* (2013.01); *C01B 32/15* (2017.08); *C08L 23/147* (2013.01);
(Continued)

(58) Field of Classification Search
CPC ......... H01M 10/0565; H01M 10/0525; H01M 2300/0074; H01M 2300/0082;
(Continued)

(56) References Cited

U.S. PATENT DOCUMENTS

| | | |
|---|---|---|
| 2020/0006588 A1 | 1/2020 | Staser |
| 2020/0091557 A1 | 3/2020 | Lim |
| 2020/0144671 A1 | 5/2020 | Lim |

FOREIGN PATENT DOCUMENTS

| | | | |
|---|---|---|---|
| CN | 106129469 A | * | 11/2016 |
| CN | 106129469 A | | 11/2016 |

(Continued)

OTHER PUBLICATIONS

English Translation of CN 106129469 (Year: 2016).*
(Continued)

*Primary Examiner* — Maria Laios
*Assistant Examiner* — Adam J Francis
(74) *Attorney, Agent, or Firm* — The Belles Group, P.C.

(57) ABSTRACT

The present disclosure provides a polymer solid electrolyte comprising a high molecular polymer and a lithiated carbon dot, wherein the lithiated carbon dot is obtained by lithiating a carbon dot with lithium hydroxide. The present application also provides a method for preparing a lithiated carbon dot and a method for preparing a polymer solid electrolyte. In the polymer solid electrolyte provided in the present application, the lithiated carbon dot is used as lithium salts, and the introduction of the lithiated carbon dot effectively reduces the crystal phase of the polymer matrix in the electrolyte, and significantly improves the electrochemical properties such as the ionic conductivity and ionic mobility of the polymer solid electrolyte.

8 Claims, 2 Drawing Sheets

(52) U.S. Cl.
CPC .............. *C08L 33/20* (2013.01); *C08L 71/02* (2013.01); *H01M 10/0525* (2013.01); *B82Y 30/00* (2013.01); *C01P 2002/52* (2013.01); *C01P 2004/64* (2013.01); *H01M 2300/0074* (2013.01); *H01M 2300/0082* (2013.01)

(58) Field of Classification Search
CPC ........ C08L 23/147; C08L 71/02; C08L 33/20; B82Y 30/00; C01P 2002/52; C01P 2004/64
See application file for complete search history.

(56) References Cited

FOREIGN PATENT DOCUMENTS

| | | |
|---|---|---|
| CN | 108550848 A | 9/2018 |
| KR | 20180128855 A | 12/2018 |
| KR | 20180128856 A | 12/2018 |
| WO | WO2018/140932 A1 | 8/2018 |

OTHER PUBLICATIONS

Alkali metal hydroxide, Britannica, The Editors of Encyclopaedia. "Hydroxide". Encyclopedia Britannica, Dec. 29, 2017, https://www.britannica.com/science/hydroxide. Accessed Jan. 25, 2021. (Year: 2017).*

Long, Peng, et al., "Self-Protective Room-Temperature Phosphorescence of Fluorine and Nitrogen Codoped Carbon Dots," Advanced Science News—Advanced Functional Materials, Full Paper, (2018), pp. 1-10.

China Patent Office, Chinese First Office Action dated Jun. 7, 2021, for corresponding Chinese Patent Appln. No. CN201910022806.3, including English translation, pp. 1-13.

* cited by examiner

POLYMER SOLID ELECTROLYTE, PREPARATION METHOD THEREOF AND PREPARATION METHOD OF LITHIATED CARBON DOT

CROSS REFERENCE TO RELATED APPLICATIONS

This application claims the priority of Chinese Patent Application No. 201910022806.3, filed on Jan. 10, 2019, and titled with "POLYMER SOLID ELECTROLYTE, PREPARATION METHOD THEREOF AND PREPARATION METHOD OF LITHIATED CARBON DOT," and the disclosures of which are hereby incorporated by reference.

FIELD

The present disclosure relates to the field of solid electrolyte technology, in particular to a polymer solid electrolyte, a preparation method thereof and a preparation method of a lithiated carbon dot.

BACKGROUND

Solid electrolyte, as a new type of high-safe electrolyte system, has strong potential for application because it can effectively avoid battery leakage, internal short circuit and contains no flammable and explosive components. In recent years, it attracts broad attention from researchers at home and abroad.

Currently, polymer solid electrolytes in lithium batteries are formed by incorporating various lithium salts into the polymer, and functionalized nanoparticles can be further added to improve the performance of the electrolyte. However, problems including low ionic conductivity of the polymer solid electrolyte and low lithium-ion transference number, which is dependent on lithium ionic mobility, cause the cycle and rate performance of the battery to be affected, which limits its application in the market. Therefore, it is important to develop a solid electrolyte with high ionic conductivity and high lithium-ion transference number.

SUMMARY

The technical problem solved by the present disclosure is to provide a polymer solid electrolyte with high ionic conductivity and high lithium-ion transference number.

In view of this, the present application provides a polymer solid electrolyte comprising a high molecular polymer and a lithiated carbon dot, wherein the lithiated carbon dot is obtained by lithiating a carbon dot with lithium hydroxide.

Preferably, the weight of the lithiated carbon dot does not exceed 30 wt % of the high molecular polymer.

Preferably, the high molecular polymer is one or more selected from the group consisting of polyoxyethylene, polyacrylonitrile, and polypropylene carbonate, and the molecular weight of the high molecular polymer is 8,000 to 6,000,000 g/mol.

Preferably, the lithiated carbon dot has an average diameter of 3 to 8 nm.

The present application also provides a method for preparing a lithiated carbon dot comprising the steps of:

performing a lithiation reaction of the carbon dot, lithium hydroxide and water to obtain a lithiated carbon dot.

The present application also provides a method for preparing a polymer solid electrolyte comprising the steps of:

performing a lithiation reaction of the carbon dot, lithium hydroxide and water to obtain a lithiated carbon dot; and mixing the lithiated carbon dot with a high molecular polymer to obtain a polymer solid electrolyte.

Preferably, the preparation process of the carbon dot is specifically performed by:

heating glucose and ethanol, followed by drying to obtain a carbon dot.

Preferably, the step of obtaining the polymer solid electrolyte is specifically performed by:

grinding a lithiated carbon dot and a high molecular polymer to obtain a mixture;

mixing the mixture with an organic solvent, heating and stirring the mixture, followed by vacuum drying to obtain a polymer solid electrolyte.

Preferably, the polymer solid electrolyte has a thickness of 20 to 1,000 μm.

The present application also provides a lithium ion battery comprising a positive electrode, a negative electrode, and an electrolyte, wherein the electrolyte is the polymer solid electrolyte as described above, or the polymer solid electrolyte prepared by the method as described above.

The present application provides a polymer solid electrolyte comprising a lithiated carbon dot and a high molecular polymer. In the polymer solid electrolyte, the lithiated carbon dot, as a lithium salt, can dissociate out a carbon dot anion and a lithium cation in the battery reaction of the solid electrolyte. Since the carbon dot anion has a larger volume relative to the lithium ion, it is more difficult to move in the solid electrolyte, thereby effectively increasing the lithium-ion transference number. At the same time, since the lithiated carbon dot has a nanometer size and good dispersibility, it can be uniformly dispersed in the high molecular polymer, which can effectively reduce the crystallinity of the high molecular polymer matrix in the electrolyte, improve the chain migration ability of the high molecular polymer matrix in the battery reaction, and thereby improve the ionic conductivity of the solid electrolyte.

DETAILED DESCRIPTION

Figure 1:
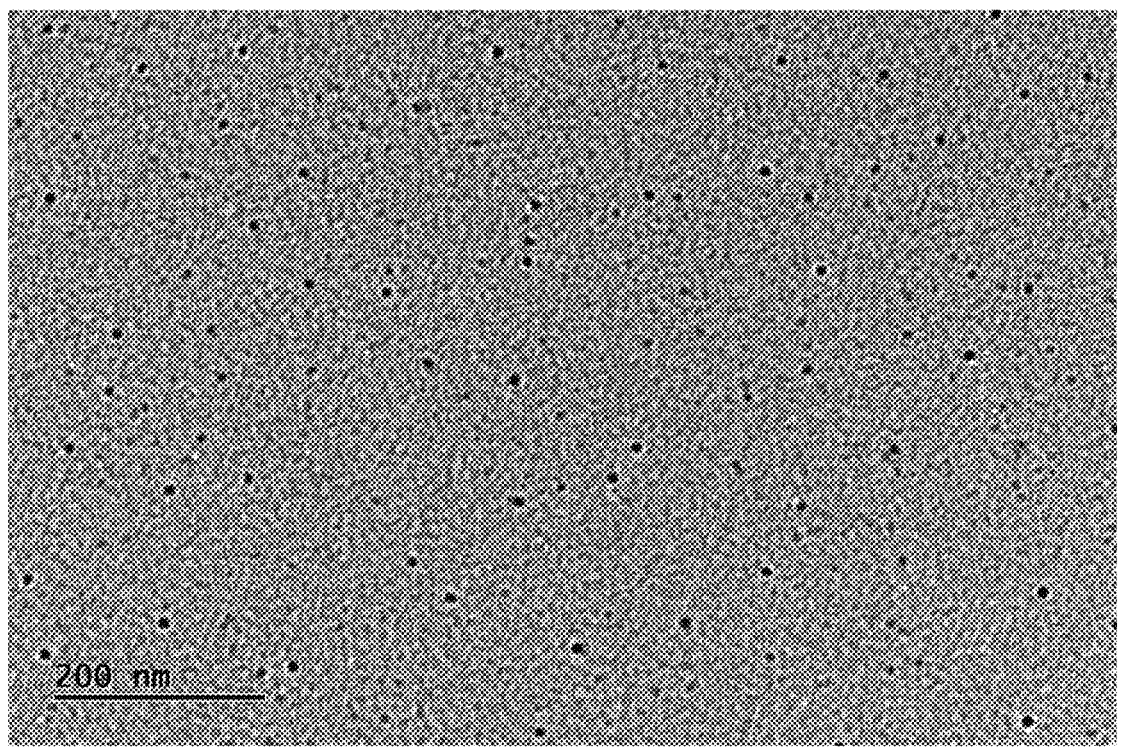
FIG. 1 is a photograph of the lithiated carbon dot under a transmission electron microscope.

For better understanding of the present disclosure, the preferred embodiments of the present disclosure will be further described in combination of examples. However, it should be understood that these descriptions are only for further illustrating the features and the advantages of the present disclosure and it should not be interpreted as limiting the claims of the present disclosure.

In view of the low ionic conductivity and lithium-ion transference number lithium ionic mobility of the solid electrolyte in the prior art, the present application provides a polymer solid electrolyte, which has higher ionic conductivity and lithium-ion transference number due to a lithium salt, ie., a lithiated carbon dot introduced into the polymer solid electrolyte. Specifically, the examples of the present disclosure disclose a polymer solid electrolyte comprising a high molecular polymer and a lithiated carbon dot, wherein the lithiated carbon dot is obtained by lithiating a carbon dot with lithium hydroxide.

The polymer solid electrolyte provided in the present application comprises a high molecular polymer and a lithiated carbon dot, wherein the lithiated carbon dot is obtained by lithiating a carbon dot with lithium hydroxide. In the above-mentioned approach of achieving the lithiation carbon dot, the carbon dot is a carbon dot well known to those skilled in the art, and the preparation method thereof is not particularly limited in the present application, and it can be obtained in a manner well known to those skilled in the art; the lithiation process is also a technical means well known to those skilled in the art, and no particular limitation is imposed herein. The high molecular polymer is a high molecular polymer well known to those skilled in the art. As an example, the high molecular polymer is selected from one or more of polyoxyethylene, polyacrylonitrile and polypropylene carbonate.

The polymer solid electrolyte of the present application is a mixture of a high molecular polymer and a lithiated carbon dot, wherein the weight of the lithiated carbon dot does not exceed 30 wt % of the high molecular polymer. In a specific embodiment, the weight of the lithiated carbon is 25 wt % of the high molecular polymer. Theoretically, the ionic conductivity of the solid electrolyte depends on the mobility ability of the segment of the polymer matrix. The higher the crystallinity is, the higher the regularity of the segment arrangement is and the more unfavorable for its motion, so the lower the ionic conductivity is. Therefore, the higher the weight ratio of the lithiated carbon dot to the high molecular polymer is, the lower the crystallinity of the high molecular polymer is, so the higher the ionic conductivity is. But if the lithiated carbon dot exceeds the weight ratio of the present application, the lithiated carbon dot inside the polymer solid electrolyte will form defects, resulting in a significant decrease in its mechanical properties. The lithiated carbon dots in the present application have an average diameter of 3 to 8 nm.

The molecular weight of the high molecular polymer in the present application is 8,000 to 6,000,000 g/mol; the molecular weight of the high molecular polymer is closely related to the ionic conductivity and the mechanical properties. Taking polyoxyethylene as an example, in the solid electrolyte, the polyoxyethylene, having a lower molecular weight as compared with that having a high molecular weight, in its internal segment has stronger mobility ability and higher ionic conductivity, but its mechanical properties are poor.

The present application also provides a method for preparing a lithiated carbon dot comprising the steps of:
performing a lithiation reaction of the carbon dots, lithium hydroxide and water to obtain a lithiated carbon dot.

In the preparation of the above lithiated carbon dot, the carbon dot, lithium hydroxide and water are subjected to lithiation reaction to obtain a lithiated carbon dot; in the process, the carbon dot can be prepared according to the method well known to those skilled in the art, and specifically:
heating β-D-glucopyranose with ethanol and drying to obtain a carbon dot; more specifically:
adding β-D-glucopyranose and ethanol to a reaction vessel, heating the mixture, after that cooling the mixture to room temperature, and then removing ethanol to obtain a carbon dot.

In the process of preparing the lithiated carbon dot, the carbon dot is performed to hydrothermal reaction with lithium hydroxide, that is, lithium ions replace the hydrogen in the carbon dot; the carbon dot contains a large amount of oxygen-containing groups such as hydroxyl group and carboxyl group, and the lithium ion in the lithium hydroxide undergoes an acid-base neutralization reaction with the hydrogen coupled to oxygen to form an ionic bond, thereby obtaining a lithiated carbon dot.

In order to make the obtained lithiated carbon dot facilitate the subsequent preparation of the polymer solid electrolyte, the preparation process of the lithiated carbon dot is specifically:
adding the carbon dot and lithium hydroxide to deionized water for lithiation reaction to obtain an aqueous solution of lithiated carbon dot;
drying the aqueous solution of lithiated carbon dot to obtain lithiated carbon dot powder.

The above means of drying are well known to those skilled in the art and are not particularly limited herein.

After obtaining the lithiated carbon dot, the present application provides a method for preparing a polymer solid electrolyte, comprising the following steps:
performing a lithiation reaction of the carbon dots, lithium hydroxide and water to obtain a lithiated carbon dot;
mixing the lithiated carbon dot with a high molecular polymer to obtain a polymer solid electrolyte.

The above prepared lithiated carbon dot is mixed with a high molecular polymer to obtain a polymer solid electrolyte; in the process, in order to ensure uniform mixing of the lithiated carbon dot and the high molecular polymer, the above process is more specifically:
grinding the lithiated carbon dot and a high molecular polymer to obtain a mixture;
mixing the mixture with an organic solvent, heating and stirring the mixture, followed by vacuum drying to obtain a polymer solid electrolyte.

In the above process, the time of heating and stirring is at least 12 hours, and the temperature of vacuum drying is 60 to 150° C. The organic solvent is an organic solvent well known to those skilled in the art, and is specifically selected from one of dimethyl sulfoxide, dichloromethane and xylene.

Through the above process, the polymer solid electrolyte prepared by the present application forms a polymer solid electrolyte membrane having a thickness of 20 to 1000 μm; in a specific embodiment, the thickness of the polymer solid electrolyte membrane is 50 to 500 μm; the impedance of the solid electrolyte is generally great, and thus reducing the membrane thickness can reduce the impedance and improve the performance of the battery; the greater the thickness of the polymer electrolyte membrane is, the greater the impedance is and the worse the battery performance is, but the thickness should not be too small, otherwise it is easy to short circuit.

The present application also provides a lithium ion battery comprising a positive electrode, a negative electrode and an electrolyte, wherein the electrolyte is the polymer solid electrolyte as described above, or the polymer solid electrolyte prepared by the method as described above.

The present application provides a polymer solid electrolyte, and also provides a method for preparing a lithiated carbon dot and a method for preparing a polymer solid electrolyte. In the polymer solid electrolyte provided in the present application, the introduction of lithium salts, i.e., the lithiated carbon dot effectively reduces the crystal phase of the high molecular polymer matrix in the electrolyte, and significantly improves the electrochemical properties such as the ionic conductivity and lithium-ion transference number of the polymer solid electrolyte.

In order to further understand the present disclosure, the polymer solid electrolyte provided in the present disclosure and the preparation method thereof will be described in detail below with reference to the examples, and the protection scope of the present disclosure is not limited by the following examples.

Preparation of lithiated carbon dots 1) 1 g of β-D-glucopyranose and 40 ml of ethanol were separately added to a reaction vessel, and after the reaction vessel was completely sealed, it was placed in a muffle furnace and heated (160° C.) for 12 h; after the reaction was cooled to room temperature, the reaction product was added to a round bottom flask, and ethanol was removed by a rotary evaporator;
2) the obtained solid and lithium hydroxide were added to 100 ml of deionized water for lithiation reaction, and the mixture was adjusted to pH=8, to obtain an aqueous solution of a lithiated carbon dot;
3) the aqueous solution of the lithiated carbon dot was placed in a round bottom flask, and water was removed by a rotary evaporator to obtain a dried lithiated carbon dot powder; wherein the lithiated carbon dot had an average diameter of 3 to 8 nm (as shown in FIG. 1).

EXAMPLE 1

1) 20 mg of the lithiated carbon dot powder as prepared above and 80 mg of the polyoxyethylene (molecular weight: 80,000 to 1,000,000 g/mol) were added to a mortar for grinding;
2) the ground mixed powder was dissolved in 50 mL of dimethyl sulfoxide, heated and stirred for 24 hours, poured into a mold, and vacuum dried (temperature: 60° C.) to obtain a lithiated carbon dot solid electrolyte film having a thickness of 50 μm.

Figure 2:
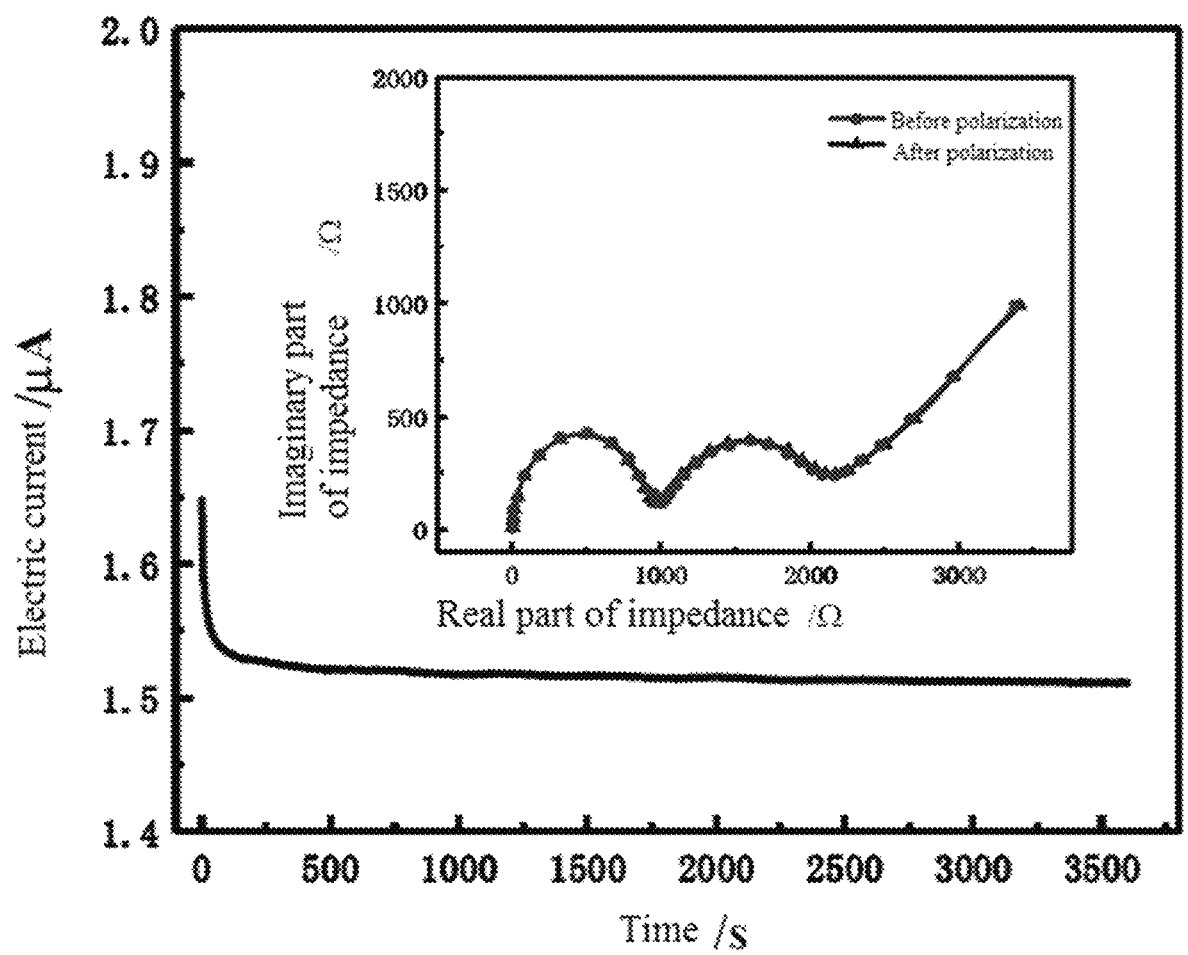
FIG. 2 is a polarization curve diagram of the lithium/lithium symmetrical battery prepared by using a carbon dot solid electrolyte in Example 1.

The lithiated carbon dot solid electrolyte was tested to have an ionic conductivity of $1.08 \times 10^{-4}$ S/cm at 25° C. As shown in FIG. 2, the lithium-ion transference number of the lithiated carbon dot solid electrolyte prepared in the present example was up to 0.89.

EXAMPLE 2

1) 20 mg of the lithiated carbon dot powder as prepared above and 80 mg of the polyacrylonitrile (molecular weight: 86,000 to 162,400 g/mol) were added to a mortar for grinding;
2) the ground mixed powder was dissolved in 50 mL of dimethyl sulfoxide, heated and stirred for 24 hours, poured into a mold, and vacuum dried (temperature: 60° C.) to obtain a lithiated carbon dot solid electrolyte film having a thickness of 50 μm.

The lithiated carbon dot solid electrolyte was tested to have an ionic conductivity of $7.53 \times 10^{-5}$ S/cm at 25° C., and the lithium-ion transference number was up to 0.81.

EXAMPLE 3

1) 20 mg of the lithiated carbon dot powder as prepared above and 80 mg of the polypropylene carbonate (molecular weight: 46,000 to 72,400 g/mol) were added to a mortar for grinding;
2) the ground mixed powder was dissolved in 50 mL of dimethyl sulfoxide, heated and stirred for 24 hours, poured into a mold, and vacuum dried (temperature: 60° C.) to obtain a lithiated carbon dot solid electrolyte film having a thickness of 50 μm.

The lithiated carbon dot solid electrolyte was tested to have an ionic conductivity of $8.89 \times 10^{-5}$ S/cm at 25° C., and the lithium-ion transference number was up to 0.79.

The above description of the examples is merely to assist in understanding the method and the core idea of the present invention. It should be noted that one of ordinary skill in the art can also make several improvements and modifications without departing from the principles of the present invention. These improvements and modifications should also be regarded fallen within the scope of protection of the present invention.

The above description in the above examples enables those skilled in the art to carry out or use the present disclosure. Various modifications to these examples are obvious to those skilled in the art, and the general principles defined herein may be implemented in other examples without departing from the spirit or scope of the present disclosure. Therefore, the present disclosure is not to be limited to the examples shown herein, but the scope of the present disclosure should be in line with the broadest scope of the principles and novel features disclosed herein.

The invention claimed is:

1. A polymer solid electrolyte comprising a high molecular polymer and a lithiated carbon dot, wherein the lithiated carbon dot is obtained by lithiating a carbon dot with lithium hydroxide;
wherein the weight ratio of the lithiated carbon dot to the high molecular polymer is between 25 wt % to 30 wt %.

2. The polymer solid electrolyte according to claim 1, wherein the high molecular polymer is one or more selected from the group consisting of polyoxyethylene, polyacrylonitrile, and polypropylene carbonate, and the molecular weight of the high molecular polymer is 8,000 to 6,000,000 g/mol.

3. The polymer solid electrolyte according to claim 1, wherein the lithiated carbon dot has an average diameter of 3 to 8 nm.

4. A lithium ion battery comprising a positive electrode, a negative electrode, and an electrolyte, wherein the electrolyte is the polymer solid electrolyte according to claim 1.

5. A method for preparing a polymer solid electrolyte comprising the steps of:
performing a lithiation reaction of the carbon dot, lithium hydroxide and water to obtain a lithiated carbon dot; and
mixing the lithiated carbon dot with a high molecular polymer to obtain a polymer solid electrolyte;
wherein the weight ratio of the lithiated carbon dot to the high molecular polymer is between 25 wt % to 30 wt %.

6. The method according to claim 5, wherein the step of obtaining the polymer solid electrolyte is specifically:
grinding the lithiated carbon dot and a high molecular polymer to obtain a mixture;
mixing the mixture with an organic solvent, heating and stirring the mixture, followed by vacuum drying to obtain a polymer solid electrolyte.

7. The method according to claim 6, wherein the polymer solid electrolyte has a thickness of 20 to 1,000 μm.

8. A lithium ion battery comprising a positive electrode, a negative electrode, and an electrolyte, wherein the electrolyte is the polymer solid electrolyte prepared by the method according to claim 5.

* * * * *